United States Patent
Kim et al.

(10) Patent No.: US 8,553,931 B2
(45) Date of Patent: Oct. 8, 2013

(54) SYSTEM AND METHOD FOR ADAPTIVELY DEFINING A REGION OF INTEREST FOR MOTION ANALYSIS IN DIGITAL VIDEO

(75) Inventors: Yeong-Taeg Kim, Irvine, CA (US); Ning Xu, Irvine, CA (US)

(73) Assignee: Samsung Electronics Co., Ltd., Suwon, Gyeonggi-Do (KR)

( * ) Notice: Subject to any disclaimer, the term of this patent is extended or adjusted under 35 U.S.C. 154(b) by 790 days.

(21) Appl. No.: 12/369,664

(22) Filed: Feb. 11, 2009

(65) Prior Publication Data

US 2010/0202663 A1 Aug. 12, 2010

(51) Int. Cl.
*G06K 9/00* (2006.01)

(52) U.S. Cl.
USPC ........................................... 382/103

(58) Field of Classification Search
None
See application file for complete search history.

(56) References Cited

U.S. PATENT DOCUMENTS

| | | | |
|---|---|---|---|
| 2010/0040292 A1* | 2/2010 | Clarkson | 382/201 |
| 2010/0050134 A1* | 2/2010 | Clarkson | 715/863 |

\* cited by examiner

*Primary Examiner* — Claire X Wang
*Assistant Examiner* — Thomas A James
(74) *Attorney, Agent, or Firm* — IP Investment Law Group (57) ABSTRACT

A system and method for adaptively defining a region of interest for motion analysis in digital video is disclosed. In one embodiment, a method of detecting a gesture is disclosed which comprises receiving a video sequence comprising a plurality of frames, determining a region of interest which excludes a portion of the frame, and detecting the gesture within the region of interest.

19 Claims, 8 Drawing Sheets

|    | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |    |
|----|---|---|---|---|---|---|---|---|---|---|----|----|----|----|----|----|----|----|----|----|----|----|----|----|----|
| 0  | 0 | 0 | 0 | 0 | 0 | 0 | 0 | 0 | 0 | 0 | 0  | 0  | 0  | 0  | 0  | 0  | 0  | 0  | 0  | 0  | 0  | 0  | 0  | 0  | 0  |
| 1  | 1 | 1 | 1 | 0 | 0 | 0 | 0 | 0 | 0 | 0 | 0  | 0  | 1  | 1  | 1  | 1  | 0  | 0  | 0  | 0  | 0  | 0  | 0  | 0  | 0  |
| 2  | 0 | 0 | 0 | 0 | 1 | 1 | 1 | 0 | 0 | 1 | 1  | 1  | 1  | 1  | 1  | 1  | 1  | 0  | 1  | 1  | 1  | 0  | 0  | 0  | 1  |
| 3  | 0 | 0 | 0 | 0 | 0 | 0 | 1 | 1 | 1 | 1 | 0  | 1  | 1  | 1  | 1  | 1  | 1  | 1  | 1  | 1  | 0  | 0  | 0  | 0  | 1  |
| 4  | 0 | 0 | 0 | 1 | 1 | 1 | 1 | 1 | 1 | 0 | 0  | 0  | 1  | 1  | 1  | 1  | 1  | 0  | 0  | 0  | 0  | 0  | 0  | 0  | 1  |
| 5  | 0 | 0 | 0 | 0 | 0 | 0 | 1 | 1 | 1 | 1 | 0  | 0  | 0  | 0  | 0  | 0  | 1  | 1  | 0  | 0  | 0  | 0  | 0  | 0  | 1  |
| 6  | 0 | 0 | 0 | 0 | 0 | 0 | 0 | 0 | 0 | 0 | 0  | 0  | 0  | 0  | 0  | 0  | 0  | 0  | 0  | 0  | 0  | 0  | 0  | 0  | 1  |
| 7  | 0 | 0 | 0 | 0 | 0 | 0 | 0 | 1 | 1 | 1 | 1  | 1  | 0  | 0  | 0  | 0  | 0  | 0  | 0  | 0  | 0  | 1  | 0  | 0  | 0  |
| 8  | 0 | 0 | 0 | 0 | 0 | 1 | 1 | 1 | 1 | 1 | 0  | 0  | 1  | 0  | 0  | 0  | 0  | 0  | 0  | 1  | 0  | 0  | 0  | 0  | 1  |
| 9  | 0 | 0 | 0 | 0 | 1 | 1 | 1 | 1 | 1 | 1 | 1  | 1  | 1  | 1  | 0  | 0  | 0  | 0  | 0  | 0  | 0  | 0  | 0  | 0  | 1  |
| 10 | 0 | 0 | 0 | 0 | 0 | 0 | 0 | 0 | 0 | 0 | 0  | 0  | 0  | 0  | 0  | 0  | 1  | 0  | 0  | 0  | 0  | 0  | 1  | 0  | 0  |

SYSTEM AND METHOD FOR ADAPTIVELY DEFINING A REGION OF INTEREST FOR MOTION ANALYSIS IN DIGITAL VIDEO

BACKGROUND

1. Field

This disclosure relates to the detection of a gesture in a sequence of ordered points, and in particular relates to the detection of a gesture within a, region of interest.

2. Description of the Related Technology

Initially, televisions were controlled using predefined function buttons located on the television itself Wireless remote controls were subsequently developed to allow users to access functionality of the television without needing to be within physical reach of the television. However, as televisions have become more feature-rich, the number of buttons on remote controls has increased correspondingly. As a result, users have been required to remember, search, and use a large number of buttons in order to access the full functionality of the device. More recently, the use of hand gestures has been proposed to control televisions and computer displays. Some approaches directed to the use of hand gestures in these environments suffer from problems of user unfriendliness and computational overhead requirements.

Two types of gestures which may be used to control a television or other device include a circling gesture and a waving gesture. Detecting circles from a digital image is very important in applications such as those involving shape recognition. The most well-known methods for accomplishing circle detection involve application of the Generalized Hough Transform (HT). However, the input of Hough Transform-based circle detection algorithms is a two-dimensional image, i.e. a matrix of pixel intensities. Similarly, prior methods of detecting of a waving motion in a series of images, such as a video sequence, have been limited to analysis of the temporal variation of an intensity value. One method of detecting the motion of a waving hand involves detecting a periodic intensity change with a Fast Fourier Transform (FFT). These and other methods of gesture recognition can suffer degraded accuracy due to background motion unrelated to the motion of the gesture. In view of the above, it is apparent that there exists a need to increase the accuracy of gesture recognition methods under conditions when there is background motion unrelated to the motion of the gesture.

SUMMARY OF CERTAIN INVENTIVE ASPECTS

[[KMOB to Complete Upon Finalization of the Claims]]

DETAILED DESCRIPTION OF CERTAIN EMBODIMENTS

The following detailed description is directed to certain specific sample aspects of the development. However, the development can be embodied in a multitude of different ways as defined and covered by the claims. In this description, reference is made to the drawings wherein like parts are designated with like numerals throughout.

Control of media devices, such as televisions, cable boxes, or DVD players, is often accomplished by the user of such devices through the use of a remote control. However, such a remote control is often frustratingly complex and easily misplaced, forcing the user from the comfort of their viewing position to either attempt to find the remote or to manually change system parameters by interacting physically with the media device itself.

Recent developments in digital imagery, digital video, and computer processing speed have enabled creation of real-time human-machine interfaces that do not require additional hardware outside of the device, as described in U.S. patent application Ser. No. 12/037,033, entitled "System and method for television control using hand gestures," filed Feb. 25, 2008, which is herein incorporated by reference in its entirety.

Figure 1:
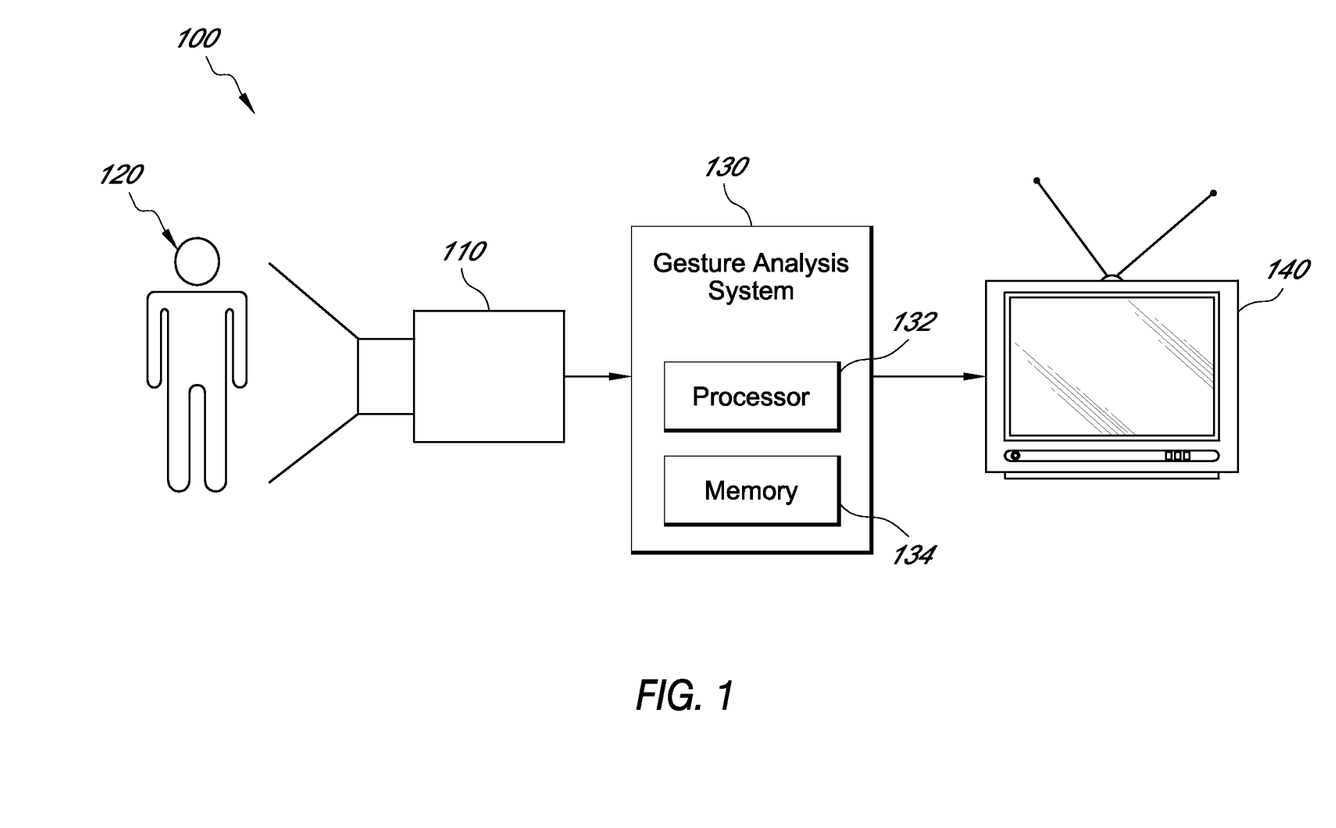
FIG. 1 is a functional block diagram of an exemplary computer vision system utilizing an embodiment of gesture detection for control of a device via a human-machine interface.

An exemplary embodiment of a human-machine interface that does not require additional hardware outside of the device is described with respect to FIG. 1. FIG. 1 is a functional block diagram of an exemplary computer vision system utilizing an embodiment of gesture detection for control of a device via a human-machine interface.

The system 100 is configured to capture video of a user 120 using a video capture device 110, to determine whether a recognized gesture has been performed by the user 120 by analyzing the video with a gesture analysis system 130, and to control parameters of the system e.g., parameters of the device 140, based on the determination by the gesture analysis system 130.

In one embodiment, the system 100 is configured to interpret hand gestures from a user 120. The system 100 comprises the video capture device 110 to capture video of hand gestures performed by the user 120. In some embodiments, the video capture device 110 may be controllable such that the user 120 being surveyed can be in various places or positions. In other embodiments, the video capture device 110 is static and the hand gestures of the user 120 must be performed within the field of view of the video capture device 110. The video (or image) capture device 110 can include cameras of varying complexity such as, for example, a "webcam" as is well-known in the computer field, or more sophisticated and technologically advanced cameras. The video capture device 110 may capture the scene using visible light, infrared light, or another part of the electromagnetic spectrum.

Image data that is captured by the video capture device 110 is communicated to a gesture analysis system 130. The gesture analysis system 130 can comprise a personal computer or other type of computer system including one or more processors 132. The processor 132 may be any conventional general purpose single- or multi-chip microprocessor such as a Pentium® processor, Pentium II® processor, Pentium III® processor, Pentium IV® processor, Pentium® Pro processor, a 8051 processor, a MIPS® processor, a Power PC® processor, or an ALPHA® processor. In addition, the processor may be any conventional special purpose microprocessor such as a digital signal processor.

In one embodiment, the gesture analysis system 130 also includes a memory 134 which is in data communications with the processor 132. Memory refers to electronic circuitry that allows information, typically computer data, to be stored and retrieved. Memory can refer to external devices or systems, for example, disk drives or tape drives. Memory can also refer to fast semiconductor storage (chips), for example, Random Access Memory (RAM) or various forms of Read Only Memory (ROM), which are directly connected to the one or more processors 132 of the gesture analysis system 130.

The gesture analysis system 130 analyzes video captured by the video capture device 110 to determine if the video represents a recognized gesture performed by the user 120. The gesture analysis system 130 is configured to control parameters of the system 100, e.g., parameters of the device 140, when it is determined that a recognized gesture has been performed. For example, if the gesture analysis system 130 determines that the user has performed a circling motion, the system might turn a television on or off. Other parameters, such as the volume or channel of the television, may be changed in response to indentified movements of specific types.

Figure 2:
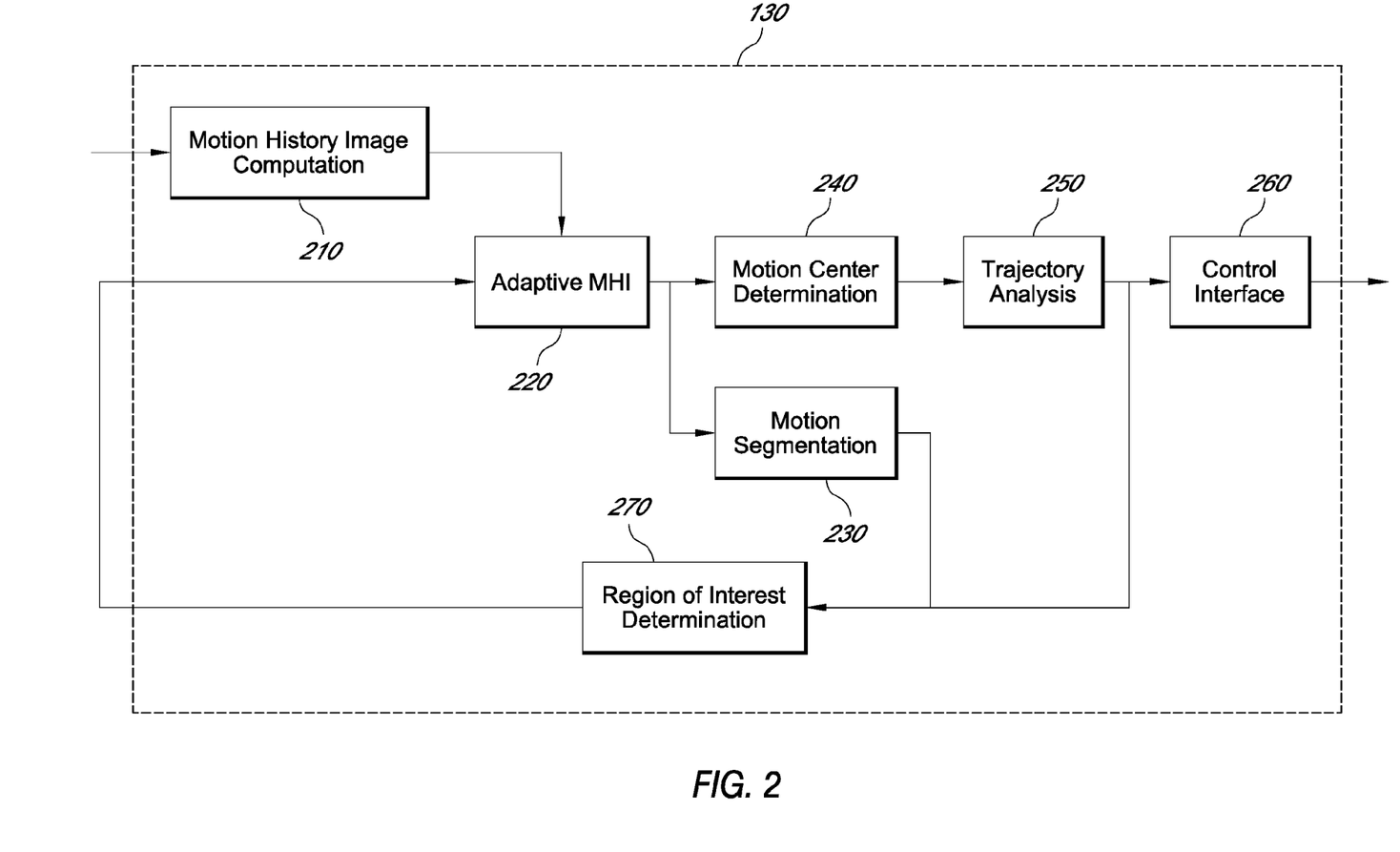
FIG. 2 is a functional block diagram of an exemplary gesture analysis system.

FIG. 2 is a functional block diagram of an exemplary gesture analysis system. As described above, the gesture analysis system 130 receives video data, analyzes the video data, and outputs commands to change parameters of the system.

The video data is input into a motion history image computation module 210, which determines a motion history image. One method of determining a motion history image is described below with respect to FIGS. 3 and 4. Further information concerning motion history images is described in U.S. patent application Ser. No. 12/127,738, entitled "Systems and methods for estimating the centers of moving objects in a video sequence," filed May 27, 2008, which is hereby incorporated by reference in its entirety, and which incorporation specifically includes but is not limited to paragraphs [0032]-[0037].

The determined motion history image from the motion history image computation module 210 is fed into an adaptive motion history image module 220. The adaptive motion history image module 220 modifies the determined motion history image in accordance with a region of interest (ROI) which is also fed into the adaptive motion history image module 220. The ROI is determined in the ROI module 270 described more fully below.

The determined ROI can spatially exclude a portion of the frame. The region of interest can also exclude a portion of each of a subset of the frames. For example, the ROI can be a rectangular region, having a height and a width less than the height and width of the full frame. The ROI can be a circular region having a center and a radius. The ROI can also be a region having a shape corresponding to a particular gesture of a gesture database within the memory 134 of FIG. 1. For example, in order to detect a circling gesture, as described in detail below, the ROI can be donut-shaped. In other embodiments, the ROI can include the entire frame.

The ROI can differ for different frames of the received video sequence. For example, after detection of a circling gesture, a rectangular ROI bounding the gesture (or motion region associated with the gesture) can be determined for a number of frames following the detection, after which the ROI can be determined to include the entire frame. As another example, after detection of motion within a frame, a circular ROI can be determined for the subsequent frame, wherein the ROI is centered at the detected motion. For further subsequent frames, the ROI can expand. For example, the radius of the ROI can increase as a function of the number of frames between the detected motion and the current frame for which an ROI is being determined.

In one embodiment, the ROI is stored as a binary mask, in which each pixel of the frame is associated with either a binary '1' or a binary '0', wherein a binary '1' indicates that the pixel is part of the ROI and a binary '0' indicates that the pixel is not part of the ROI. In another embodiment, the ROI is stored as a number of coordinates outlining the boundaries of the ROI. In yet another embodiment, the ROI is stored as a single coordinate and a scalar value, such as radius or a rectangular size.

The adaptive motion history image module 220 changes the motion history image based on the ROI. In one embodiment, the pixels of the adapted motion history image are equal to the pixels of the motion history image for pixels within the ROI, and zero elsewhere. Although a binary region of interest is primary described herein, in other embodiments, the ROI is a non-binary pixel weighting. For example, a circular ROI may be interpreted by the adaptive motion history image module 220 to weight pixels based on their distance from a particular pixel location.

The adapted motion history image is analyzed by both a motion segmentation module 230 and a motion center module 240. Motion segmentation and motion center determination are described with respect to FIGS. 5 and 6. Further information concerning motion segmentation and motion center determination is described in the previously incorporated U.S. patent application Ser. No. 12/127,738, entitled "Systems and methods for estimating the centers of moving objects in a video sequence," filed May 27, 2008, specifically paragraphs [0038]-[0043].

The motion center output by the motion center determination module 240 of FIG. 2 is fed into a trajectory analysis module 250 to determine if the trajectory defined by the motion centers defines a recognized gesture. The trajectory analysis module 250 is configured to determine if the defined trajectory describes one or more predefined motions. For example, the motion centers provided by the motion center determination module 240 can correspond to the motion of the hand of a user and the trajectory analysis module 250 analyzes the points to determine if the hand of the user describes a waving motion, a circular motion, or another recognized gesture.

Further information concerning trajectory analysis is described in U.S. patent application Ser. No. 12/183,973, entitled "System and method for motion detection based on object trajectory," filed Jul. 31, 2008, which is hereby incorporated by reference in its entirety, and which incorporation specifically includes but is not limited to paragraphs [0128]-[0166]. Further information concerning trajectory analysis with respect to a circular motion is described in U.S. patent application Ser. No. 12/184,008, entitled "System and method for circling detection based on object trajectory," filed Jul. 31, 2008, which is hereby incorporated by reference in its entirety. Further information concerning trajectory analysis with respect to waving motion is described in U.S. patent application Ser. No. 12/183,994, entitled "System and method for waving detection based on object trajectory," filed Jul. 31, 2008, which is hereby incorporated by reference in its entirety. The trajectory analysis module 250 may access a gesture database within the memory 134 of FIG. 1, in which a collection of recognized gestures and/or rules relating to the detection of the recognized gestures are stored.

In one embodiment, the output of the trajectory analysis module 250 is a determination that a particular gesture has or has not been detected. In another embodiment, the output of the trajectory analysis module 250 is a determination of which, if any, gesture has been detected. The trajectory analysis module 250 can also output information regarding the detected gesture. For example, the trajectory analysis module 250 can output an indication that a circling gesture has been detected and also output the orientation (clockwise or counter-clockwise) of the gesture. The trajectory analysis module 250 can output an indication that a waving gesture has been detected and also output the speed at which the waving gesture was performed.

The output of the trajectory analysis module 250 is fed into a device interface 260 which interprets output to produce commands transmitted to a device, or back to the system. For example, in response to information from the trajectory analysis module that a circling gesture has been detected, the device interface 260 may transmit commands to a device to increase or decrease a volume. In another embodiment, in response to information from the trajectory analysis module that a waving gesture of a particular speed has been detected, the device interface 260 may transmit commands back to the trajectory analysis module 250 to only detect waving gestures with speeds greater than the particular speed.

Both the motion region determined by the motion segmentation module 230 and the output of the trajectory analysis module 250 are fed into the ROI module 270, which determines the region of interest used by the adaptive motion history image module 220.

The region of interest (ROI) can be determined in a number of ways. The determined ROI can spatially exclude a portion of the frame. For example, the ROI can be a rectangular region bounding the received motion region. Alternatively, the ROI can be a circular region having a center centered on the motion region, or equal to the motion center determined by the motion center determination module 240. The ROI can be the received motion region itself, or an enlarged version of the motion region obtained by including neighboring pixels. In other embodiments, the ROI can include the entire frame.

The ROI can differ for different frames of the received video sequence. For example, after detection of a circling gesture, a rectangular ROI bounding the gesture (or motion region associated with the gesture) can be determined for a number of frames following the detection, after which the ROI can be determined to include the entire frame. As another example, after detection of motion within a frame, a circular ROI can be determined for the subsequent frame, wherein the ROI is centered at the detected motion. For further subsequent frames, the ROI can expand. For example, the radius of the ROI can increase as a function of the number of frames between the detected motion and the current frame for which an ROI is being determined. One particular method of determining the ROI is described with respect to FIG. 7 below.

Figure 3:
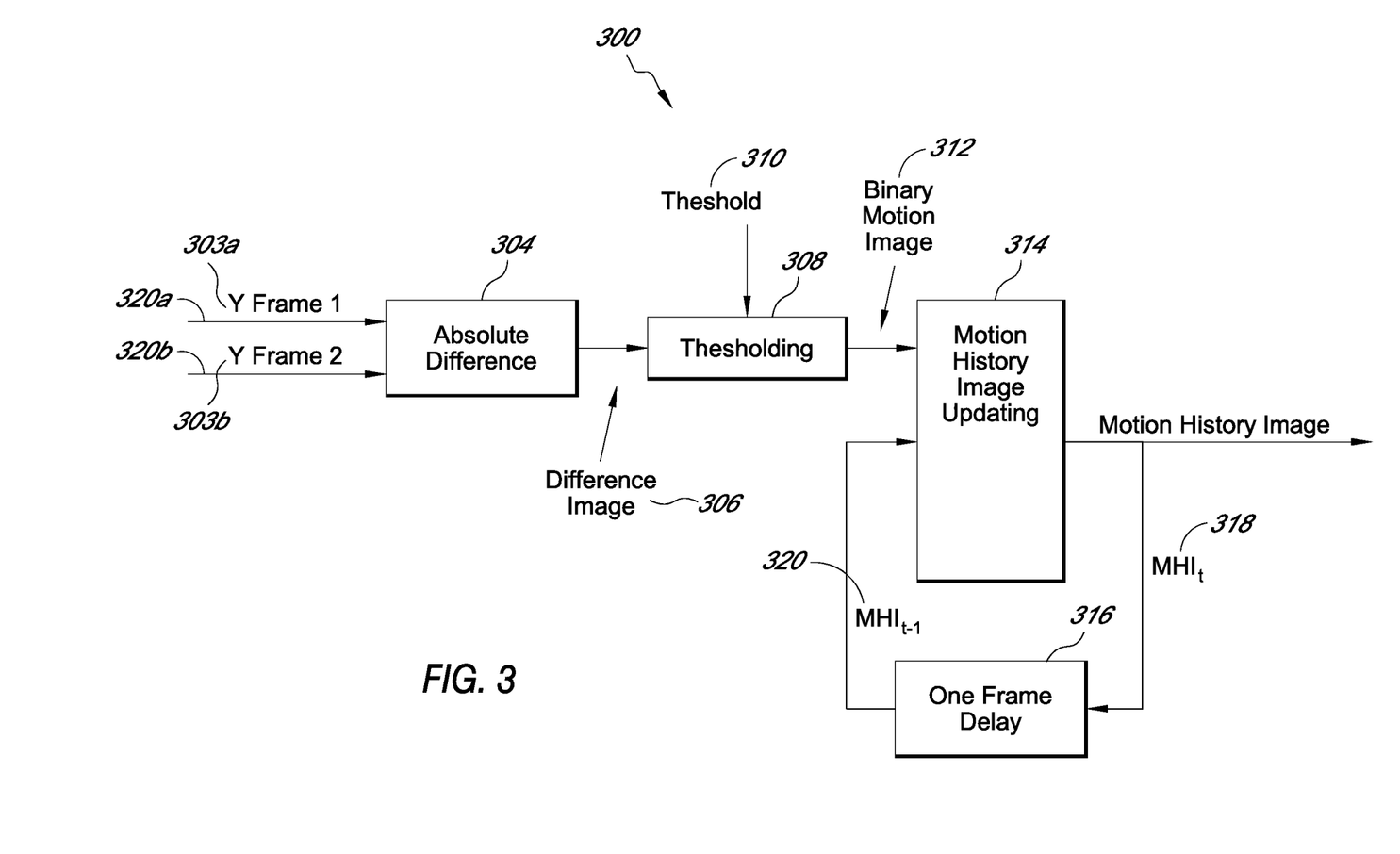
FIG. 3 is a functional block diagram of an embodiment of a system to define a motion history image (MHI).

FIG. 3 is a functional block diagram illustrating one embodiment of a system capable of computing a motion history image (MHI) for use in the motion history computation module 210 of FIG. 2. The motion history image generally indicates the pixel locations and relative time passed for motion which has occurred in the video sequence. In the system 300, two video frames 302 are input into the system 300 on inputs 302a and 302b. The video frames 302 may comprise the intensity values associated with a first frame of a video sequence and a second frame of a video sequence. The video frames 302 may comprise the intensity of a particular color value. The video frames 302, in some embodiments, are consecutive frames in the video sequence. In other embodiments, the video frames are non-consecutive so as to more quickly, but less accurately, calculate a motion history image stream. The two video frames 302 are processed by an absolute difference module 304. The absolute difference module 304 produces an absolute difference image 306, wherein each pixel of the absolute difference image 306 is the absolute value of the difference between the pixel value at the same location of the first frame 302a and the pixel value at the same location of the second frame 302b. The absolute difference image is processed by a thresholding module 308, which also takes a threshold 310 as an input.

Figure 4:
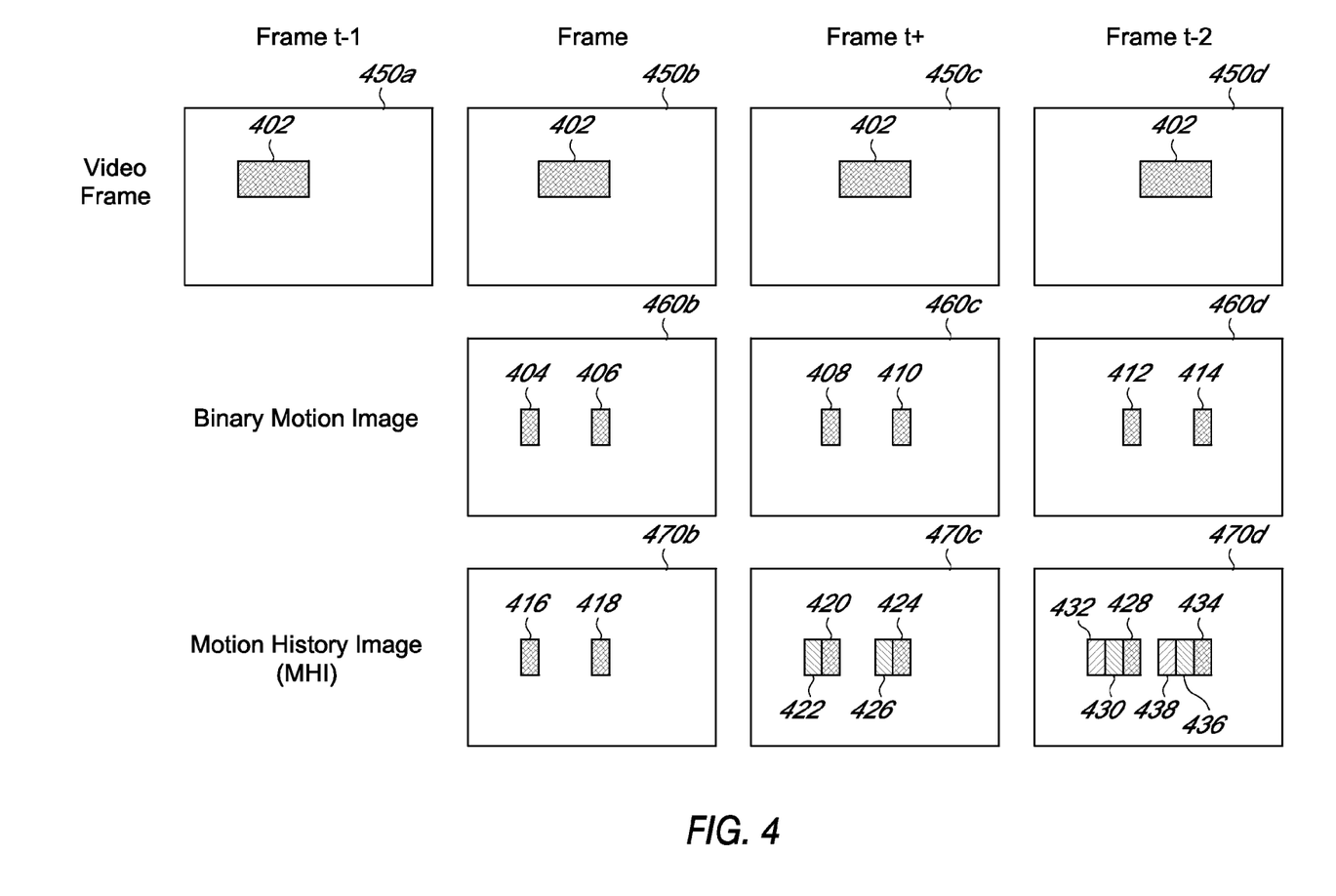
FIG. 4 is a diagram of a collection of frames of a video sequence, the associated binary motion images, and the motion history image of easy frame.

In some embodiments, the threshold 310 is fixed. The thresholding module 308 applies the threshold 310 to the absolute difference image 306 by producing a binary motion image 312 which generally indicates the location in a frame of relevant motion. The binary motion image is set to a first value if the absolute difference image 306 is above the threshold 310 and is set to a second value if the absolute difference image 306 is below the threshold 310. In some embodiments, the pixel values of the binary motion image may be either zero or one. In other embodiments, the pixel values may be 0 or 255. Exemplary video frames, binary motion images, and motion history images are shown in FIG. 4.

The binary motion image 312 is fed into a MHI updating module 314 which produces a motion history image. In the case where each frame of a video sequence is subsequently fed into the system 300, the output is a motion history image for each frame. The MHI updating module 314 also takes as an input the previously-calculated motion history image. The MHI updating module 314 produces a motion history image 318.

In one embodiment, the binary motion image 312 contains values of zero or one and the motion history image 318 contains integer values between 0 and 255. In this embodiment, one method of determining the motion history image 318 is herein described. If the value of the binary motion image 312 at a given pixel location is one, the value of the motion history image 318 at that pixel location is 255. If the value of the binary motion image 312 at a given pixel location is zero, the value of the motion history image 318 is the previous value of the motion history image 320 minus some value, which may be denoted delta. If, at some pixel, the value of the calculated motion history image 318 would be negative, it is instead set to zero. In this way, motion which happened far in the past is represented in the motion history image 318, however, it is not as intense as motion which happened more recently. In one particular embodiment, delta is equal to one. However, delta may be equal to any integer value in this embodiment. In other embodiments, delta may have non-integer values or be negative. In another embodiment, if the value of the binary motion image 312 at a given pixel location is zero, the value of the motion history image 318 is the previous value of the motion history image 320 multiplied by some value, which may be denoted alpha. In this way, the motion which happened in the past is represented in the motion history image 318, but is reduced exponentially in intensity the further in the past the motion occurs. For example, alpha may be one-half. Alpha may also be nine-tenths or any value between zero and one. In general, larger values of alpha more strongly de-emphasize past motion.

The motion history image 318 is output from the system 300, but is also input into a delay module 316 which stores the previously-calculated motion history image 320 to be used later by the MHI updater 314.

FIG. 4 is a diagram of a collection of frames of a video sequence, the associated binary motion images, and the motion history image of each frame. Four data frames 450a, 450b, 450c, 450d are shown, which represent a video sequence of an object 402 moving across the screen from left to right. The first two video frames 450a and 450b are used to determine a binary motion image 460b. Described above is a system and method for producing such a binary motion image 460b and also a motion history image 470b from two video frames. The first binary motion image 460b shows two regions of motion 404, 406. Each region corresponds to either the left of the right side of the object 402. The calculated motion history image 470b is identical to the binary motion image 460b as there is no previously-calculated motion history image. Alternatively, the previously-calculated motion history image can be assumed to be all zeros. Motion history image 470b shows regions 416, 418 corresponding to regions 404, 406 of the binary motion image 460b. The second frame 450b used in the determination of the first motion history image 470b becomes the first frame used in the determination of a second motion history image 470c, which is produced in the same manner as the first motion history image 470b. Using the two video frames 450b and 450c, a binary motion image 460c is formed. Again, there are two regions of motion 408, 410 corresponding to the left and right side of the object as it appears in frame 450c. The motion history image 470c is the binary motion image 460c superimposed over a "faded" version of the previously-calculated motion history image 470b. Thus regions 422 and 426 correspond to the regions 416 and 418, whereas the regions 420 and 424 correspond to the regions 408 and 410 of the binary motion image 460c. Similarly, a binary motion image 460d and motion history image 470d are calculated using video frames 450c and 450d. The motion history image 470d seems to show a "trail" of the objects motion.

Figure 5:
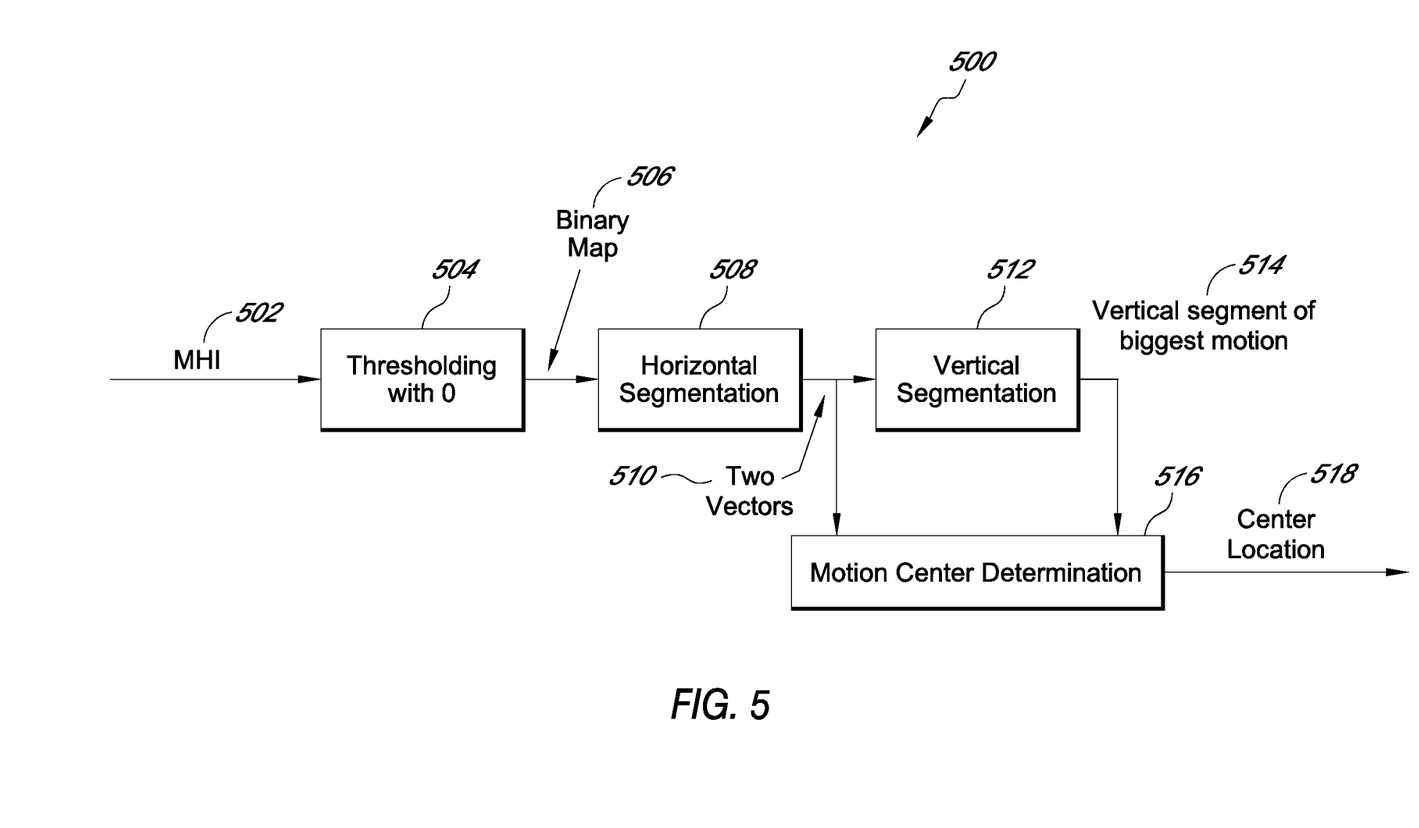
FIG. 5 is a functional block diagram of an embodiment of a system which determines one or more motion segments and one or more motion centers.
Figure 6:
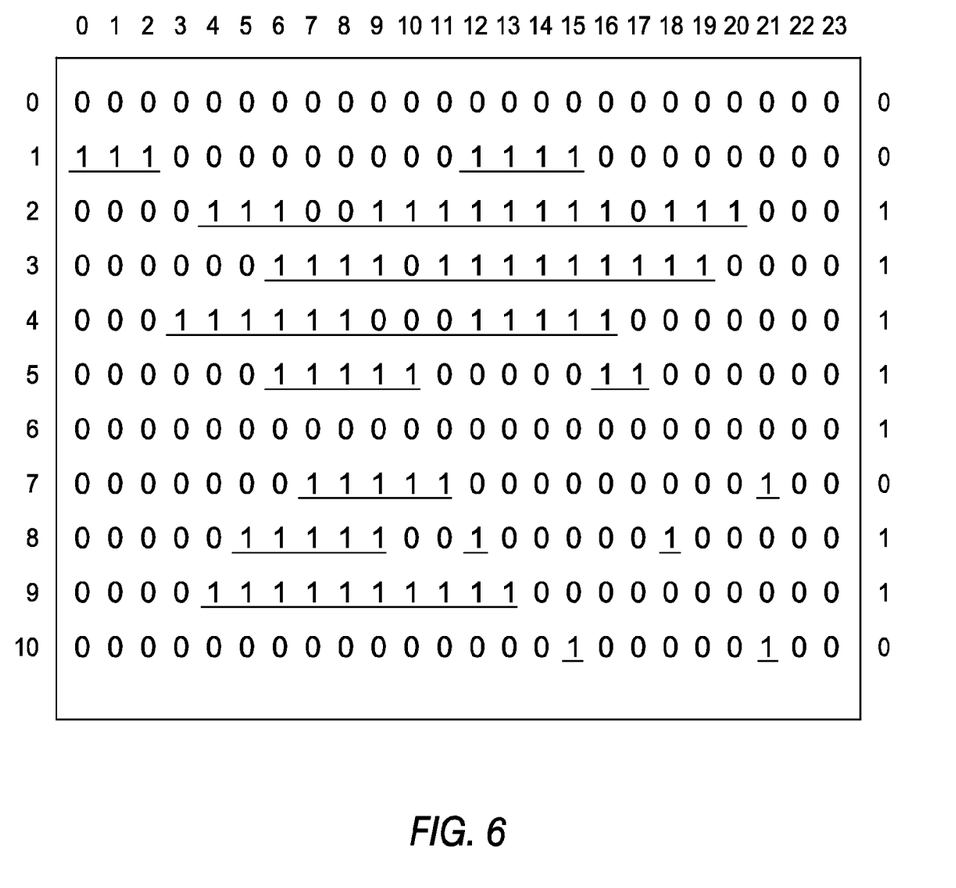
FIG. 6 is a diagram of a binary map which may be utilized in performing one or more of the methods described herein.

FIG. 5 is a functional block diagram of an embodiment of a system which determines one or more motion segments and one or more motion centers for use in the motion segmentation module 230 and motion center determination module 240 of FIG. 2. The adapted motion history image 502 is input to the system 500. The adapted motion history image 502 is input into a thresholding module 504 to produce a binary map 506. The thresholding module 504 compares the value of the motion history image 502 at each pixel to a threshold. If the value of the motion history image 502 at a certain pixel location is greater than the threshold, the value of the binary map 506 at that pixel location is set to one. If the motion history image 502 at a certain pixel location is less than the threshold, the value of the binary map 506 at that pixel location is set to zero. The threshold may be any value, for example, 100, 128, or 200. The threshold may also be variable depending on the motion history image, or other parameters derived from the video sequence. An exemplary binary map is shown in FIG. 6.

Motion segmentation is performed in two steps, horizontal segmentation, and vertical segmentation. The horizontal segmentation module 508 selects a horizontal segment of moving area within a row of the binary map 506, yielding an output of two values: start position and length of the segment. The horizontal segmentation module 508 may also output two values: start position and end position. Each row of the binary map 506 can be analyzed by the horizontal segmentation module 508. In one embodiment, for each row of the binary map 506, two values are output: the start position of the longest horizontal segment, and the length of the longest horizontal segment. Alternatively, the two output values may be the start position of the longest horizontal segment and the end position of the longest horizontal segment. In other embodiments, the horizontal segmentation module 508 can output values associated with more than one horizontal segment.

A horizontal segment, in one embodiment, is a series of ones in a row of a binary map. The row of the binary map may undergo pre-processing before horizontal segments are identified. For example, if a single zero is found in the middle of a long string of ones, the zero may be flipped and set to one. Such a "lone" zero may be adjacent to other zeros in the image, but not in the row of the image. Also, a zero may be considered a lone zero if it is at the edge of an image and not followed or preceded by another zero. More generally, if a series of zeros have a longer series of ones on either side, the entire series of zeros may be set to one. In other embodiments, the neighboring series of ones may be required to be twice as long as the series of zeros for flipping to take place. This, and other pre-processing methods, reduce noise in the binary map.

The two resultant vectors 510 from the horizontal segmentation module 508, e.g. the start position and length of the longest horizontal segment for each row of the binary map, are input into the vertical segmentation module 512. In the vertical segmentation module 512, which may be a separate module or part of the horizontal segmentation module 508, each row of the binary map is marked as 1 if the length of the longest horizontal segment is greater than a threshold, and 0 otherwise. Two consecutive 1s in this sequence are considered connected if the two corresponding horizontal segments have an overlap exceeding some value. The overlap can be calculated using the start position and length of the respective motion segments. In one embodiment, an overlap of 30% is used to indicate that consecutive horizontal segments are connected. Such a connection is transitive, e.g. a third consecutive 1 in the sequence may be connected to the first two. Each sequence of connected 1s defines a vertical segment. A size is associated with each vertical segment. The size may be, in one embodiment, the number of connected 1s, e.g. the length of the vertical segment. The size may also be the number of pixels associated with the vertical segment, calculable from the lengths of the horizontal segments. The size may also be the number of pixels associated with the vertical segment having some characteristic, such as a color similar to a skin tone, thus enabling tracking of human hands.

As mentioned, each vertical segment is associated with one or more horizontal segments, and each horizontal segment is associated with one or more pixels. Therefore, each vertical segment is associated with one or more pixels which represent a motion region. This motion region is output from the motion segmentation module 230 of FIG. 2 and fed into the region of interest module 270 described further below.

The vertical segment (or segments) with the greatest size 514, as well as the vectors 510 from the horizontal segmentation module 508 and the MHI 502 are input into a motion center determination module 516. The output of the motion center determination module 516 is a location associated with each input vertical segment. The location may correspond to a pixel location, or may be between pixels. The motion center, in one embodiment, is defined as a weighted average of the pixel locations associated with the vertical segment. In one embodiment, the weight of a pixel is the value of the motion history image at that pixel location if the value of the motion history image is above a threshold and zero otherwise. In other embodiments, the weight of a pixel is uniform, e.g. 1, for each pixel.

FIG. 6 is a diagram of a binary map which may be utilized in performing one or more of the methods described herein.

The binary map 600 is first input into a horizontal segmentation module 508 which identifies the horizontal segments of each row of the binary map. The module 508 then produces outputs defining the start location and length of the longest horizontal segment for each row. For example, for row 0 of FIG. 6, there are no horizontal segments, as the binary map is composed of all zeros. In row 1, there are two horizontal segments, one starting at index 0 of length 3, and another starting at index 10 of length 4. In some embodiments, the horizontal segmentation module 508 could output both of these horizontal segments. In other embodiments, only the longest horizontal segment (e.g., the one starting at index 10) is output. In row 2, there are either one, two, or three horizontal segments depending on the embodiment of the system used. In one embodiment, lone zeros surrounded by ones (such as the zero at index 17) are changed into ones before processing. In another embodiment, sequences of zeros surrounded by longer sequences of ones (such as the sequence of two zeros at indices 7 and 8) are changed into ones before processing. In such an embodiment, one horizontal segment starting at index 4 of length 17 is identified. Identified horizontal segments, using one embodiment of the invention, are indicated in FIG. 6 by underline. Also, each row is marked either 1 or 0 on the right of the binary map if the longest horizontal segment is of length five or more. In other embodiments, a different threshold may be used. The threshold may also change depending on characteristics of other rows, e.g., neighboring rows.

Figure 7:
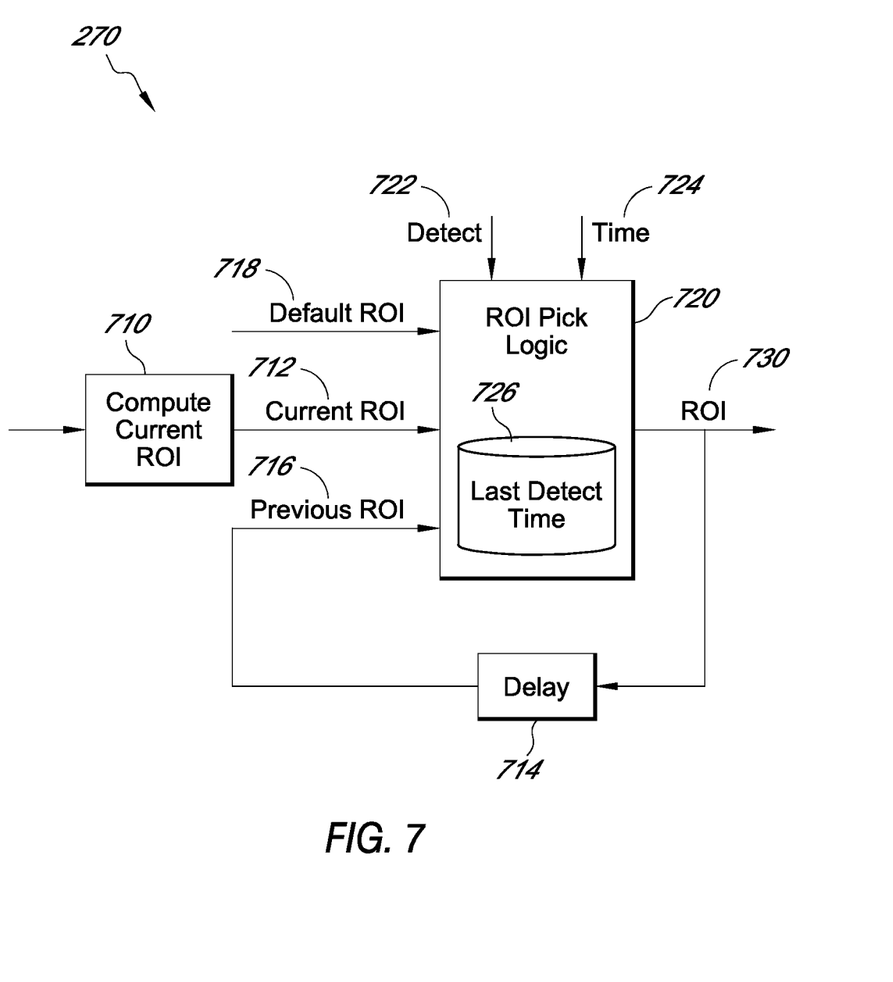
FIG. 7 is a component block diagram of an embodiment of an ROI module.

The ROI determination can include selection of a previously determined ROI. In one embodiment, the ROI is determined by ROI pick logic 720 within the ROI module 270. FIG. 7 is a functional block diagram of an embodiment of an ROI module. The ROI module 270 receives data regarding the video sequence, which is fed into an ROI computation module 710. The data can include the video itself or data derived from the video by the gesture analysis system 130, such as a motion region or one or more motion centers. The ROI computation module 710 analyzes the data to generate a current ROI 712. The current ROI 712 is fed into ROI pick logic 720. The current ROI is also fed into a delay block 714 which, after a delay, feeds the previous ROI 716 to the ROI pick logic 720. The ROI pick logic can also select a default ROI 718. The default ROI 718 can include the entire frame. In another embodiment, the default ROI excludes portions of the frame, such as the corners or the edges, where gestures are less likely to be detected.

The ROI pick logic 720 is configured to determine the ROI 730 relative to the gesture to be detected. In one embodiment, the ROI pick logic 720 is further provided with a determination of detection 722 and the current time 724. The determination of detection 722 may be communicated from the trajectory analysis module 250 as a '1' when a recognized gesture is detected in the frame and as a '0' when no gesture is detected. In another embodiment, the determination of detection 722 is a '1' when motion is detected in the frame, even if the motion does not define a recognized gesture. The ROI pick logic 720 can use the determination of detection 722 and the current time 724 to store a last detection time 726.

In one embodiment, the ROI pick logic 720 determines the ROI 730 relative to the gesture to be detected from the current ROI 712, the previous ROI 714, or the default ROI 716. If the determination of detection 722 is a '1', the ROI pick logic 720 determines the ROI 730 to be the current ROI 712. For example, if a circling gesture was just detected, the ROI 730 can be a rectangular region bounding the motion of the gesture. If the determination of detection 722 is a '0' and the time between the current time 724 and the last detection time 726 is less than a threshold, the ROI pick logic 720 determines the ROI 730 to be the previous ROI 714. In the example above, the ROI 730 will remain the rectangular region bounding the motion of the previously detected circling gesture. If the determination of previous detection 722 is a '0' and the time between the current time 724 and the last detection time 726 is greater than a threshold, the ROI pick logic 720 determines the ROI 730 to be the default ROI 716.

Figure 8:
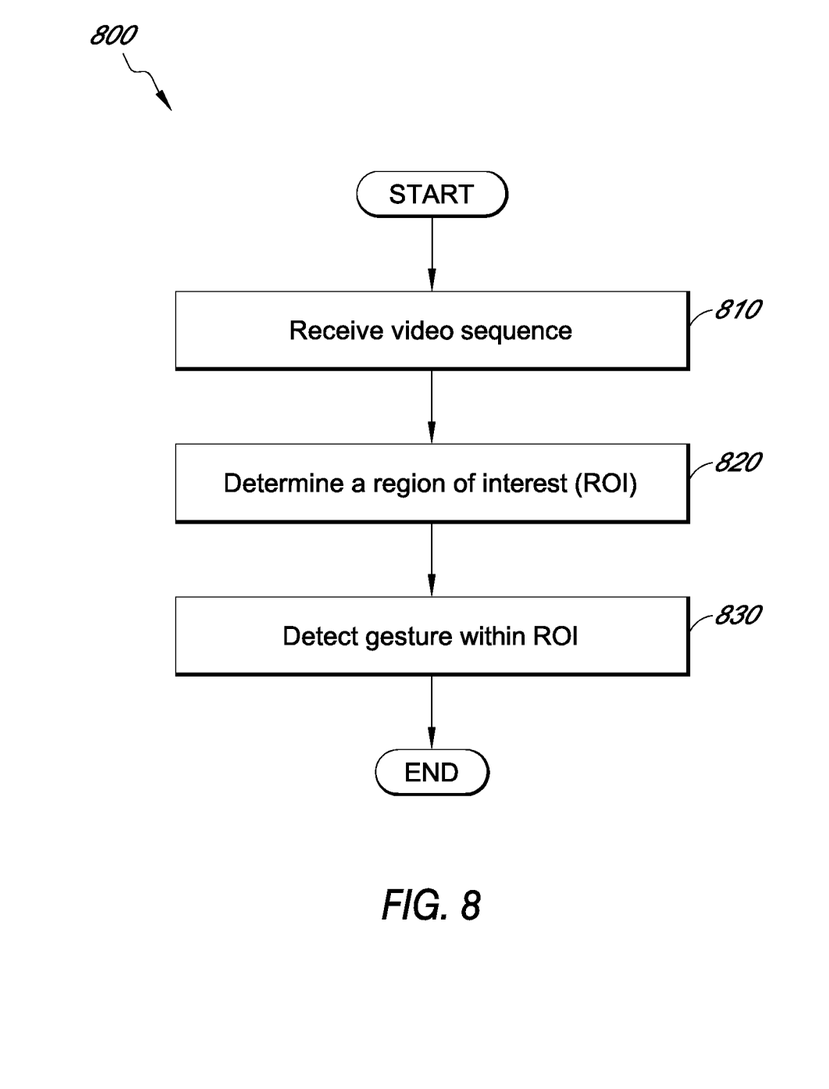
FIG. 8 is a flowchart illustrating a method of detecting a gesture within a region of interest of a video sequence.

FIG. 8 is a flowchart illustrating a method of detecting a gesture within a region of interest of a video sequence. The procedure 800 begins in block 810, wherein a video sequence comprising a plurality of video frames is received by, e.g., the gesture analysis subsystem 130. The video sequence may be received, for example, via the video capture device 110, or it may be received from the memory 134 or over a network. In some embodiments of the method, the received video sequence is not what is recorded by the video capture device 110, but a processed version of the video data. For example, the video sequence may comprise a subset of the video data, such as every other frame or every third frame. In other embodiments, the subset may comprise selected frames as processing power permits. In general, a subset may include only one element of the set, at least two elements of the set, at least three elements of the set, a significant portion (e.g. at least 10%, 20%, 30%) of the elements of the set, a majority of the elements of the set, nearly all (e.g., at least 80%, 90%, 95%) of the elements of the set, or all of the elements of the set. Additionally, the video sequence may comprise the video data subjected to image and/or video processing techniques such as filtering, desaturation, and other image processing techniques known to those skilled in the art.

Another form of processing that may be applied to the video data is object detection, classification, and masking. Frames of the video may be analyzed such that every pixel location that is not a member of a specific object class is masked out, e.g., set to zero or simply ignored. In one embodiment, the object class is human hands, and thus a video of a human hand in front of a background image (e.g., the user, a couch, etc.) would be processed such that the result is the user's hand moving in front of a black background. Further information concerning object segmentation, classification, and detection is described in U.S. patent application Ser. No. 12/141,824, entitled "Systems and methods for class-specific object segmentation and detection," filed Jun. 18, 2008, which is hereby incorporated by reference in its entirety, and which incorporation specifically includes but is not limited to paragraphs [0045]-[0073].

Next, in block 220, a region of interest (ROI) is determined for at least one of the frames. The ROI can be determined, in one embodiment, by the ROI module 270 of FIG. 2. Alternatively, the ROI can be retrieved from the memory 134 of FIG. 1, received with the video data from the video capture device 110, or received over a network.

The ROI determined in block 820 of the procedure 800 is relative to a gesture to be detected within the video sequence received in block 810. The determination can include selection of a previously determined ROI. In one embodiment, the ROI is determined by the ROI pick logic 720 of FIG. 7.

After the ROI has been determined in block 220 of FIG. 2, the procedure 200 continues to block 230, wherein a gesture is detected within the region of interest. Gesture detection techniques are described in detail in the applications previously incorporated by reference herein. In particular, U.S. patent application Ser. No. 12/183,973, entitled "System and method for motion detection based on object trajectory," filed Jul. 31, 2008 includes a number of methods of gesture detection. By determining a region of interest, extraneous processing can be avoided by focusing the detection with the region of interest. Also, background motion noise outside the region of interest can be discarded, increasing the accuracy of gesture detection within the region of interest.

While the above description has pointed out novel features of the development as applied to various embodiments, the skilled person will understand that various omissions, substitutions, and changes in the form and details of the device or process illustrated may be made without departing from the scope of the development. Therefore, the scope of the development is defined by the appended claims rather than by the foregoing description. All variations coming within the meaning and range of equivalency of the claims are embraced within their scope.

What is claimed is:

1. A method detecting a gesture, the method comprising:
   receiving a video sequence having a gesture and a plurality of frames;
   determining a motion history image based on the video sequence;
   determining a region of interest relative to the gesture for at least one of the frames, wherein the region of interest excludes a portion of each of a subset of the frames;
   modifying the motion history image based on the region of interest; and
   detecting the gesture within the region of interest and the motion history image as modified; and
   determining the region of interest as a default region of interest when a difference between a current time and a last detection time is greater than a threshold and the detection of the gesture is false.

2. The method of claim 1 wherein detecting the gesture includes:
   defining a trajectory of an object captured in the region of interest; and
   determining when the trajectory of the object defines a recognized gesture.

3. The method of claim 2 wherein the trajectory includes a sequence of ordered points.

4. The method of claim 2 wherein defining the trajectory includes:
   analyzing the plurality of the frames to determine, for each of the plurality of the frames, a portion of the region of interest which shows the object; and
   defining a center location for each of the plurality of the frames based in part on the portion of the region of interest which shows the object.

5. The method of claim 4 wherein defining the center location for each of the plurality of the frames includes defining a motion center location for the object.

6. The method of claim 1, wherein the detected gesture is a waving motion.

7. The method of claim 1, wherein the detected gesture is a circling motion.

8. The method of claim 1, wherein the region of interest includes a rectangular area.

9. The method of claim 1, wherein the region of interest includes a circular area.

10. The method of claim 1, wherein determining the region of interest is based in part on a detected motion.

11. The method of claim 1, wherein determining the region of interest is based in part on a previously detected gesture.

12. The method of claim 1, wherein the spatial component of the region of interest changes between successive frames.

13. The method of claim 1, wherein the spatial component of the region of interest expands between successive frames.

14. The method of claim 1, further comprising changing a parameter of a device in response to detecting the gesture.

15. The method of claim 14, wherein the parameter of the device is a channel, a station, a volume, a track, or a power.

16. A device comprising:
   a motion history image computation module configured to receive a video sequence having a gesture and a plurality of frames and to determine a motion history image based on the video sequence;
   a region of interest module configured to determine a region of interest relative to the gesture, wherein the region of interest excludes a portion of each of a subset of the frames;
   an adaptive motion history image module configured to modify the motion history image based on the region of interest;
   a gesture detection module configured to detect the gesture within the region of interest and the motion history image as modified; and
   wherein:
   the region of interest module is for determining the region of interest as a default region of interest when a difference between a current time and a last detection time is greater than a threshold and the detection of the gesture is false.

17. The device of claim 16, wherein the region of interest module is for determining the region of interest as a default region of interest based on one of the frames.

18. The device of claim 16, wherein the region of interest module is for determining the region of interest as a previous region of interest based on a difference between a current time and a last detection time when the detection of the gesture is false.

19. A method executed by code of a programmable storage device which, when executed, causes a processor to perform a method of detecting a gesture, the method comprising:
   receiving a video sequence having a gesture and a plurality of frames;
   determining a motion history image based on the video sequence;
   determining a region of interest relative to the gesture, wherein the region of interest excludes a portion of each of a subset of the frames
   modifying the motion history image based on the region of interest;
   detecting the gesture within the region of interest and the motion history image as modified; and
   determining the region of interest as a default region of interest when a difference between a current time and a last detection time is greater than a threshold and the detection of the gesture is false.

* * * * *